UNITED STATES PATENT OFFICE.

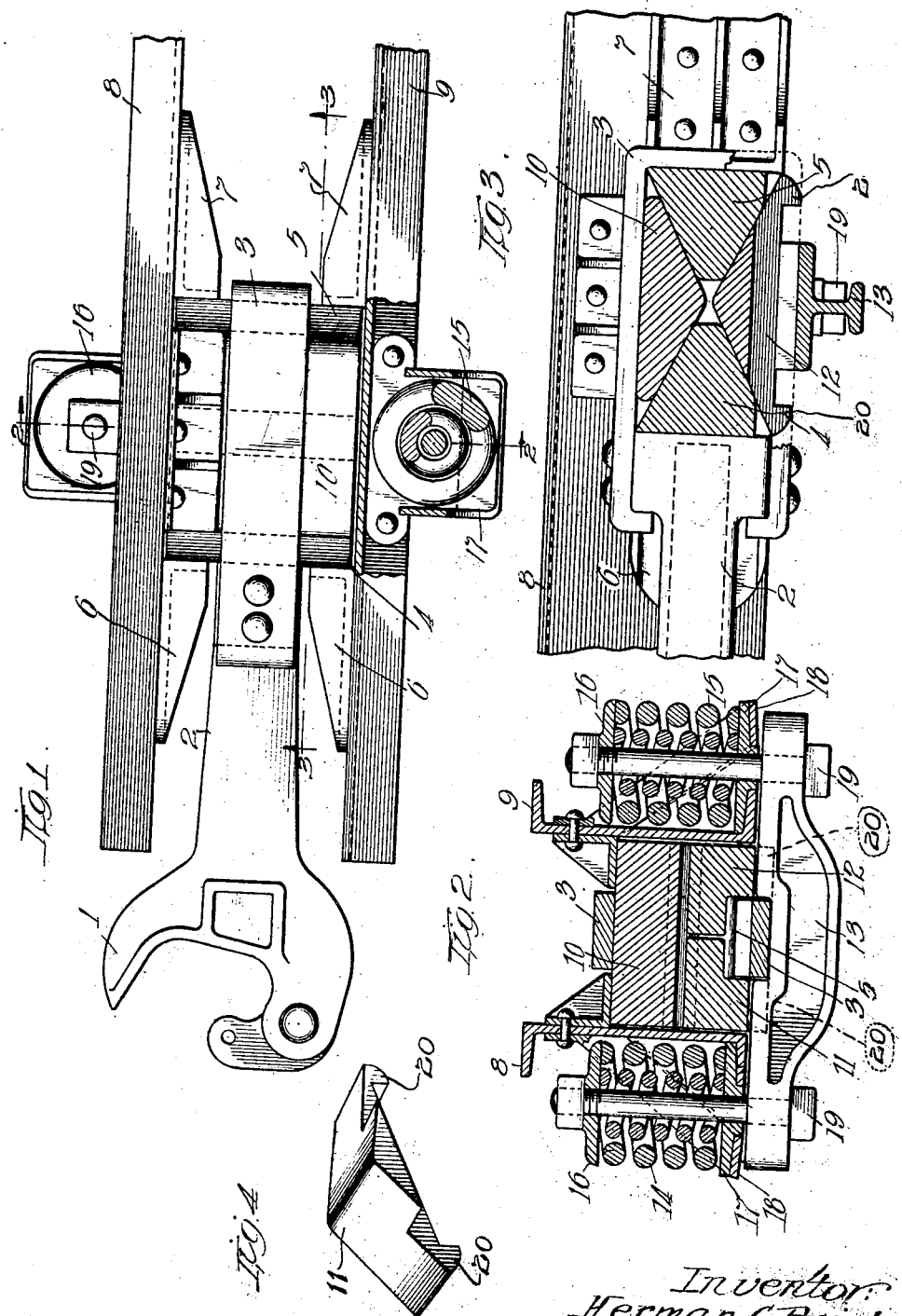

HERMAN C. PRIEBE, OF BLUE ISLAND, ILLINOIS.

DRAFT-GEAR.

1,177,722.  Specification of Letters Patent.  Patented Apr. 4, 1916.

Application filed May 20, 1915. Serial No. 29,283.

*To all whom it may concern:*

Be it known that I, HERMAN C. PRIEBE, citizen of the United States, residing at Blue Island, in the county of Cook and State of Illinois, have invented a certain new and useful Improvement in Draft-Gears, of which the following is a full, clear, concise, and exact description, reference being had to the accompanying drawings, forming a part of this specification.

My invention relates to draft gears for railway vehicles and has for its general object the employment of upright springs upon the outer sides of the center sills which are included in the construction of motion resisting mechanism.

By means of my invention two distinct springs or sets of springs may be employed in the construction of a gear, the center sills being preferably disposed between these springs, advantages being obtained which are not attendant upon the employment of co-axial springs. By employing coiled springs in upright position the center sills need not be perforated as I employ mechanism whereby the springs are enabled to perform their function without requiring the entry thereof, or parts engaging the same, within the spacing between the center sills. I am also enabled to employ any suitable length of springs without increasing the extent to which they are horizontally projected whereby springs of large capacity may be selected without danger of having them interfere with other elements of the gear structure.

The springs of the gear of my invention may, if desired, be included in the formation of a friction draft gear as will be clearly understood by reference to the accompanying drawing showing the preferred embodiment thereof when employed in a friction draft gear and in which drawing—

Figure 1 is a plan view of a draft gear embodying the invention; Fig. 2 is a view on line 2 2 of Fig. 1; Fig. 3 is a view on line 3 3 of Fig. 1; and Fig. 4 is a perspective view of an element in the construction.

Like parts are indicated by similar characters of reference throughout the different figures.

The coupler 1 includes a shank 2 that is connected with the outer end of a yoke 3 in any suitable or preferred manner.

The illustrated embodiment of the invention, being in the form of friction draft gear, includes an outer triangular friction block 4 constituting an outer follower which is engaged by the inner end of the coupler shank and an inner triangular friction block 5 constituting an inner follower which is engaged by the inner end of the yoke 3. The outer follower or friction block 4 is limited in its outward movement by cheek plates 6, while the inner follower or friction block 5 is limited in its inward movement by cheek plates 7, these cheek plates being mounted upon the inner faces of center sills 8, 9 between which the friction blocks are disposed. An upper triangular friction block 10 engages the upper sides of the friction blocks 4 and 5, while symmetrically arranged triangular friction blocks 11 and 12 (together constituting an operative equivalent of the friction block 10) engage the lower sides of the friction blocks 4 and 5, the inner and opposed vertical faces of the blocks 11 and 12 being recessed at the lower portions of these blocks to afford a space which is sufficient to receive the lower side of the yoke 3 and to permit the blocks 11 and 12 to become lowered in the operation of the gear. When this construction is adopted the remaining friction blocks 4, 5 and 10 are not raised, in the operation of the gear, the top side of the yoke preventing upward movement thereof. The friction blocks 4 and 5, though themselves rising and falling in the operation of the gear, prevent the descent of the block 10. The blocks 11 and 12 rest upon a spanner 13 which underlies all of the friction blocks and extends laterally of the center sills 8, 9 and beneath the lower flanges thereof, the outer ends of the spanner being coöperatively related with the twin sets of springs 14, 15, each set being shown in the form of two coiled springs one within the bore of the other. Each set of springs is provided with an upper cap 16 and a lower cap 17, the lower cap resting, at one side, upon the top of the lower flange of the adjacent center sill, the opposite side of the cap 17 resting upon a bracket 18 which is obliquely extended to the adjacent center sill to which the bracket is anchored at its upper end. Bolts 19 pass through the outer ends of the motion transmitting spanner 13 and through the bores of the inner springs and the upper caps 16, the heads of the bolts underlying the motion transmitting element 13 while the nuts of the bolts overlie the upper caps 16.

When the coupler is subjected to a sufficient pushing strain the inner follower or friction block 5 will be moved downwardly but not horizontally owing to its engagement with the inner cheek plates 7, while the outer follower or friction block 4 will move inwardly as well as downwardly, the consequence being that the friction elements 11 and 12 will be lowered against the pressure upwardly exerted upon the spanner 13 by the sets of springs. Conversely, when there is sufficient pull upon the coupler the outer follower or friction block 4 will be moved downwardly but not horizontally owing to its engagement with the outer cheek plates 6, while the inner follower or friction block 5 will move outwardly as well as downwardly, the consequence being that the friction elements 11 and 12 will be lowered against the pressure upwardly exerted upon the spanner 13. As the invention is embodied in a friction draft gear the followers 4 and 5 themselves constitute friction elements and whenever either follower is moved horizontally friction will be created between both followers and the friction blocks engaging the same, friction also arising between the shank and the follower 4 and between the yoke and follower 5. Thus the strains imparted to the coupler are resisted not only by the sets of springs but are also resisted by the attendant friction occurring between the friction elements.

Each of the friction elements 11 and 12 is desirably provided with downsetting hooks 20 between which the spanner 13 is disposed, these hooks being employed to insure the maintenance of the assembly of the spanner and friction blocks 11 and 12, an arrangement which is permitted because the spanner together with the sets of springs preferably do not move longitudinally of the gear but are desirably limited to upright movement and action, a result which is possible because the spring mechanism is disposed laterally of the horizontal path of movement of the followers and center sills between which the followers are disposed.

While I prefer to employ followers 4 and 5 that perform two functions, one the production of friction and the other the transmission of motion between the springs and the coupler, yet I do not wish to be limited to a construction in which these followers operate to produce operative friction.

While I have herein shown and particularly described the preferred embodiment of my invention I do not wish to be limited to the precise details of construction shown as changes may readily be made without departing from the spirit of my invention, but

Having thus described my invention I claim as new and desire to secure by Letters Patent the following:—

1. A draft gear including a coupler; outer and inner followers; sills between which the followers are disposed; upright springs between which the sills are located; and motion transferring mechanism intervening between the followers and the springs and including a spanner underlying the sills and projecting laterally thereof and which spanner is pressed upwardly by the springs.

2. A draft gear including a coupler; a follower; sills between which the follower is disposed; upright springs between which the sills are located; and motion transferring mechanism intervening between the follower and the springs and including a spanner underlying the sills and projecting laterally thereof and which spanner is pressed upwardly by the springs.

3. A friction draft gear including a coupler; outer and inner followers; sills between which the followers are disposed; upright springs between which the sills are located; and friction producing motion transferring mechanism intervening between the followers and the springs and including a spanner underlying the sills and projecting laterally thereof and which spanner is pressed upwardly by the springs.

4. A friction draft gear including a coupler; a follower; sills between which the follower is disposed; upright springs between which the sills are located; and friction producing motion transferring mechanism intervening between the follower and the springs and including a spanner underlying the sills and projecting laterally thereof and which spanner is pressed upwardly by the springs.

In witness whereof, I hereunto subscribe my name this seventeenth day of May, A. D. 1915.

HERMAN C. PRIEBE.

Witnesses:
G. L. CRAGG,
E. L. WHITE.